US012432823B2

(12) United States Patent
Pillai et al.

(10) Patent No.: US 12,432,823 B2
(45) Date of Patent: Sep. 30, 2025

(54) ELECTRIC COOKTOP ASSEMBLY

(71) Applicant: WHIRLPOOL CORPORATION, Benton Harbor, MI (US)

(72) Inventors: Binesh R. Pillai, Navi Mumbai (IN); Edward Benjamin Standen, St. Joseph, MI (US)

(73) Assignee: WHIRLPOOL CORPORATION, Benton Harbor, MI (US)

(*) Notice: Subject to any disclaimer, the term of this patent is extended or adjusted under 35 U.S.C. 154(b) by 822 days.

(21) Appl. No.: 17/734,208

(22) Filed: May 2, 2022

(65) Prior Publication Data

US 2023/0354481 A1 Nov. 2, 2023

(51) Int. Cl.
*H05B 3/74* (2006.01)
*F24C 15/08* (2006.01)

(52) U.S. Cl.
CPC ............... *H05B 3/74* (2013.01); *F24C 15/08* (2013.01)

(58) Field of Classification Search
CPC .......... F24C 15/08; F24C 15/10; F24C 7/083; H05B 3/74
USPC ........................................................ 219/460.1
See application file for complete search history.

(56) References Cited

U.S. PATENT DOCUMENTS 4,453,533 A * 6/1984 Scheidler ................. H05B 3/74 126/211
4,608,962 A 9/1986 Ng
5,568,804 A * 10/1996 Joseph ..................... F24C 3/067 126/39 N
5,785,047 A 7/1998 Bird et al.
5,841,109 A 11/1998 White et al.
6,236,027 B1 5/2001 Miyata et al.
6,281,480 B1 8/2001 Haberstetter
6,410,892 B1 * 6/2002 Peschl ................... F24C 15/108 219/461.1
2003/0029560 A1 * 2/2003 Wegert ...................... B32B 7/00 156/329
2015/0201465 A1 * 7/2015 Adelmann .............. F24C 15/08 219/461.1
2021/0063020 A1 3/2021 Duffy et al.

FOREIGN PATENT DOCUMENTS

AU 524301 9/1982
EP 2664856 11/2013
EP 3139097 3/2017
EP 3288338 2/2018
EP 3579662 12/2019

(Continued)

OTHER PUBLICATIONS

Wolf Appliance, Inc., "Installation Guide, Induction and Electric Cooktops," www.wolfappliance.com (Oct. 2011).

*Primary Examiner* — Sang Y Paik
(74) *Attorney, Agent, or Firm* — PRICE HENEVELD LLP

(57) ABSTRACT

A cooktop assembly includes a cooktop support with side frame members, a first support bracket, and a second support bracket. A glass cooktop is coupled to the cooktop support such that the lateral edges of the glass cooktop cover substantially all of the side frame members, giving the appearance of the glass cooktop extending to the edges of the cooktop assembly. The glass cooktop couples to the frame member utilizing adhesive and/or tape. The cooktop support can be used with ovens that have front or rear controls.

20 Claims, 15 Drawing Sheets

(56) References Cited

FOREIGN PATENT DOCUMENTS

| | | |
|---|---|---|
| GB | 2277146 | 10/1994 |
| JP | S60164135 | 8/1985 |
| WO | 2018188722 | 10/2018 |

* cited by examiner

ELECTRIC COOKTOP ASSEMBLY

BACKGROUND OF THE DISCLOSURE

The present disclosure generally relates to an electric cooktop and, more specifically, a glass surface that extends to the lateral edges of the electric cooktop.

SUMMARY OF THE DISCLOSURE

According to one aspect of the present disclosure, a cooktop assembly includes a cooktop support and a glass cooktop. The cooktop support includes a first side frame member with an upper surface, a face surface, an inner surface, a first end surface with a first fastener opening, and a second end surface with a second fastener opening. The cooktop support also has a second side frame member with an upper surface, a face surface, an inner surface, a first end surface with a first fastener opening, and a second end surface with a second fastener opening. The cooktop support includes a first support bracket having a face surface with a first fastener opening on a first edge, a second fastener opening on a second edge, a first tab extending perpendicularly outward from the face surface adjacent to the first edge, and a second tab extending perpendicularly outward from the face adjacent to the second edge. The first support bracket includes an upper flange portion extending perpendicularly inward from the rear surface of the first support bracket. The upper flange portion is positioned below the top of the first support bracket, forming an upper ledge with an upper wall. The first support bracket includes a lower flange portion extending perpendicularly inward from the face surface. The lower flange portion includes a plurality of openings that extend to a plurality of openings on the face surface of the first support bracket. The cooktop support includes a second support bracket that has a face surface, with a first fastener opening on a first edge, a second fastener opening on a second edge, a first tab extending perpendicularly outward from the first face adjacent to the first edge, and a second tab extending perpendicularly outward from the second face adjacent to the second edge. The second support bracket includes an inclined surface extending inwardly from an upper edge of the face surface to a bend. A ledge surface extends from the bend to an upwardly extending flange portion, the ledge surface including a section that is generally perpendicular to the face surface. The first fastener opening on the first support bracket is aligned with the first fastener opening in the first side frame member and the second fastener opening on the first support bracket is aligned with the second fastener opening on the second side frame member. The first fastener opening on second support bracket is aligned with the second fastener opening on the first side frame member and the second fastener opening on the second support bracket is aligned with the first fastener opening on the second side frame member. Fasteners are coupled to the aligned openings in the support brackets and side frame members. The glass cooktop is coupled to the cooktop support. The bottom surface of the glass cooktop is positioned above the upper surfaces of the first and second side frame members and above the upper ledge of the first support bracket and the ledge surface of the second support bracket.

According to another aspect of the present disclosure, is a cooktop assembly having a cooktop support, tape and an adhesive position on the cooktop support, and a glass cooktop contacting the tape and adhesive. The cooktop support includes a first side frame member with an upper surface, a face surface, and an inner surface, a first end surface with a first fastener opening, and a second end surface with a second fastener opening. The cooktop support includes a second side frame member having an upper surface, a face surface, an inner surface, a first end surface with a first fastener opening, and a second end surface with a second fastener opening. The cooktop support also has a first support bracket. The first support bracket has a face surface with a first fastener opening on a first edge, a second fastener opening on a second edge, a first tab extending perpendicularly outward from the face surface adjacent to the first edge, and a second tab extending perpendicularly outward from the face surface adjacent to the second edge. The first support bracket includes an upper flange portion extending perpendicularly inward from a rear surface, positioned below the top of the first support bracket, forming an upper ledge with an upper wall. The first support bracket also has a lower flange portion extending perpendicularly inward from the face surface. The cooktop support includes a second support bracket that has a face surface, with a fastener opening on a first edge, a second fastener opening on a second edge, a first tab extending perpendicularly outward from the face surface adjacent to the first edge, and a second tab extending outward from the face surface adjacent to the second edge. The second support bracket includes an inclined surface extending inwardly from an upper edge of the face surface to a bend. A ledge surface extends from the bend to an upwardly extending flange portion. The ledge surface includes a section that is generally perpendicular to the face surface. The first fastener opening on the first support bracket is aligned with the first fastener opening on the first side frame member and the second fastener opening in the first support bracket is aligned with the second fastener opening on the second side frame member. The first fastener opening on the second support bracket is aligned with the second fastener opening on the first side frame, and the second fastener opening on the second support bracket is aligned with the first fastener opening on the second side frame member. Fasteners are coupled to the aligned openings of the support brackets and side frame members. Tape is positioned on at least a portion of the upper ledge of the first support bracket and the ledge surface of the second support bracket. Adhesive is positioned on at least a portion of the upper surface of the first and second side frames. The glass cooktop is coupled to the cooktop support with a bottom surface of the glass cooktop contacting the tape and adhesive.

According to yet another aspect of the present disclosure, an oven with a cooktop assembly includes an oven with chassis that is coupled to a cooktop support. The cooktop support includes a first side frame member having an upper surface, a face surface, an inner surface, a first end surface with a first fastener opening, and a second end surface with a second fastener opening. The cooktop support also has a second side frame member with an upper surface, a face surface, an inner surface, a first end surface with a first fastener opening, and a second end surface with a second fastener opening. The cooktop support has a first support bracket with a face surface having a first fastener opening on a first edge, a second fastener opening on a second edge, a first tab extending perpendicularly outward from the face surface adjacent to the first edge with a first tab opening, and a second tab extending perpendicularly outward from the face surface adjacent to the second edge with a second tab opening. The first support bracket has an upper flange portion extending perpendicularly inward from a rear surface, positioned below the top of the first support bracket, forming an upper ledge with an upper wall. The cooktop support includes a second support bracket with a face surface, having a fastener opening on a first edge, a second fastener opening on a second edge, a first tab extending perpendicularly outward from the face surface adjacent to the first edge, a second tab extending perpendicularly outward from the face surface adjacent to the second edge. The second support bracket includes an inclined surface extending inwardly from an upper edge of the face surface to a bend, and a ledge surface extending from the bend such that the ledge surface includes a section that is generally perpendicular to the face surface. The first fastener opening on the first support bracket is aligned with the first fastener opening on the first side frame member, and the second fastener opening on the first support bracket is aligned with the second fastener opening on the second side frame member. The first fastener opening on the second support bracket is aligned with the second fastener opening on the first side frame member, and the second fastener opening on the second bracket is aligned with the first fastener opening on the second side frame member. Fasteners are coupled to the aligned openings. An adhesive is positioned on at least a portion of the upper surface of the first and second side frames. A glass cooktop is coupled to the cooktop support with a bottom surface of the glass cooktop contacting the adhesive. The cooktop support is coupled to the chassis of the oven by fasteners inserted through the first tab opening and the second tab opening on the first support bracket into openings on the oven chassis.

These and other features, advantages, and objects of the present disclosure will be further understood and appreciated by those skilled in the art by reference to the following specification, claims, and appended drawings.

Figure 1:
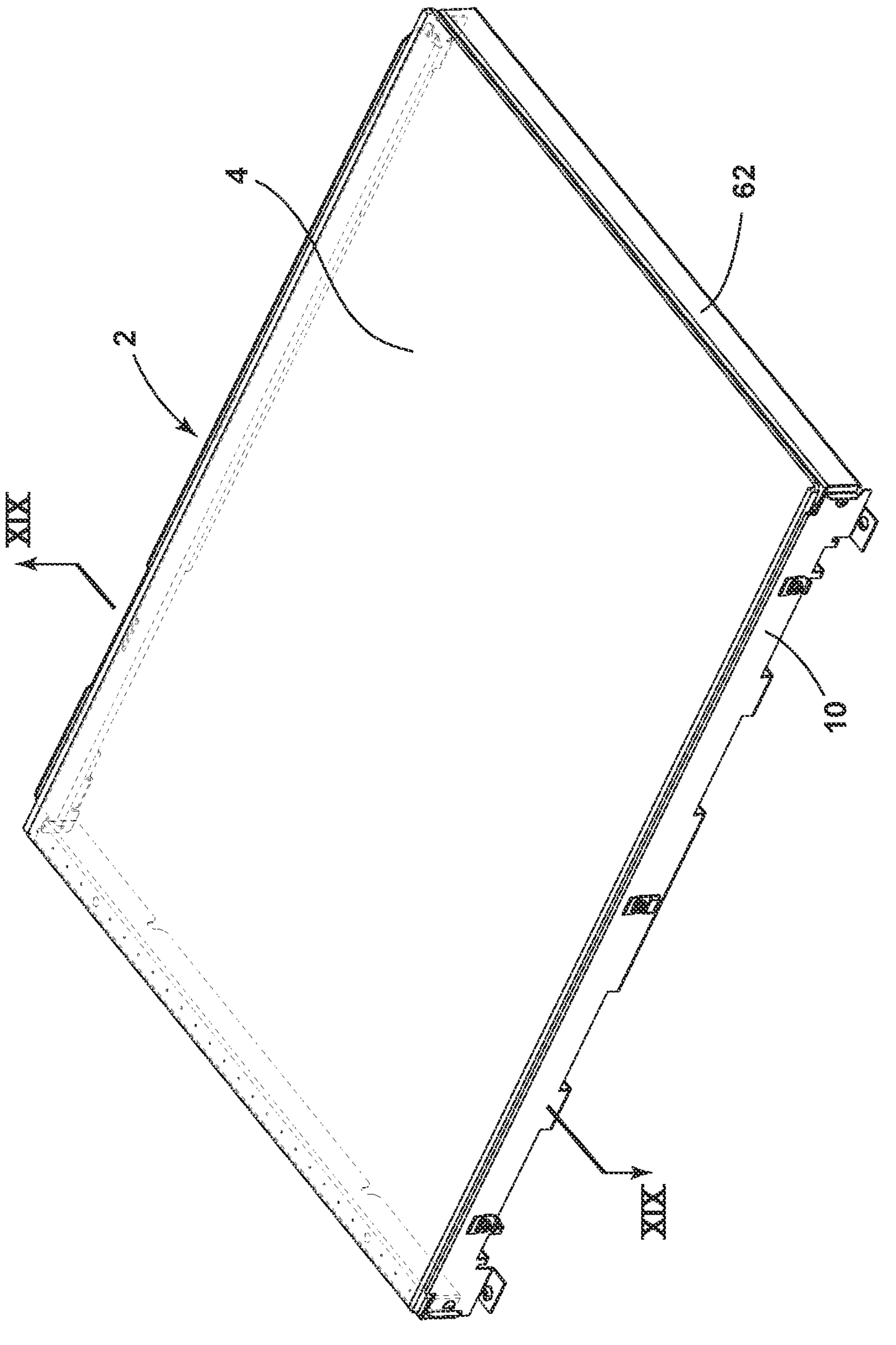
FIG. 1 is a top perspective view of a cooktop assembly according to one aspect of the present disclosure.

The components in the figures are not necessarily to scale, emphasis instead being placed upon illustrating the principles described herein.

DETAILED DESCRIPTION

The present illustrated embodiments reside primarily in combinations of method steps and apparatus components related to a bottom vent assembly for an oven. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Referring to FIGS. 1-19, reference numeral 2 generally designates a cooktop assembly. The cooktop assembly 2 includes a glass cooktop 4 having an upper surface 6 and a lower surface 8. The cooktop assembly 2 includes a cooktop support 5. The cooktop support 5 includes a first side frame member 62, a second side frame member 62, a first support bracket 10, and a second support bracket 40. The cooktop support 5 provides support for the glass cooktop 4.

The side frame members 62 have an upper surface 64, a face surface 66, and an inner surface 68. The side frame members 62 include a first end surface 70 with a fastener opening 71, and a second end surface 72 with a fastener opening 73. The upper surface 64 can include a plurality of openings 74. The openings 74 can be of different shapes, sizes, and spacing. A flange 75 can extend off of the first end surface 70 and/or the second end surface 72 of the side frame members 62.

Figure 2:
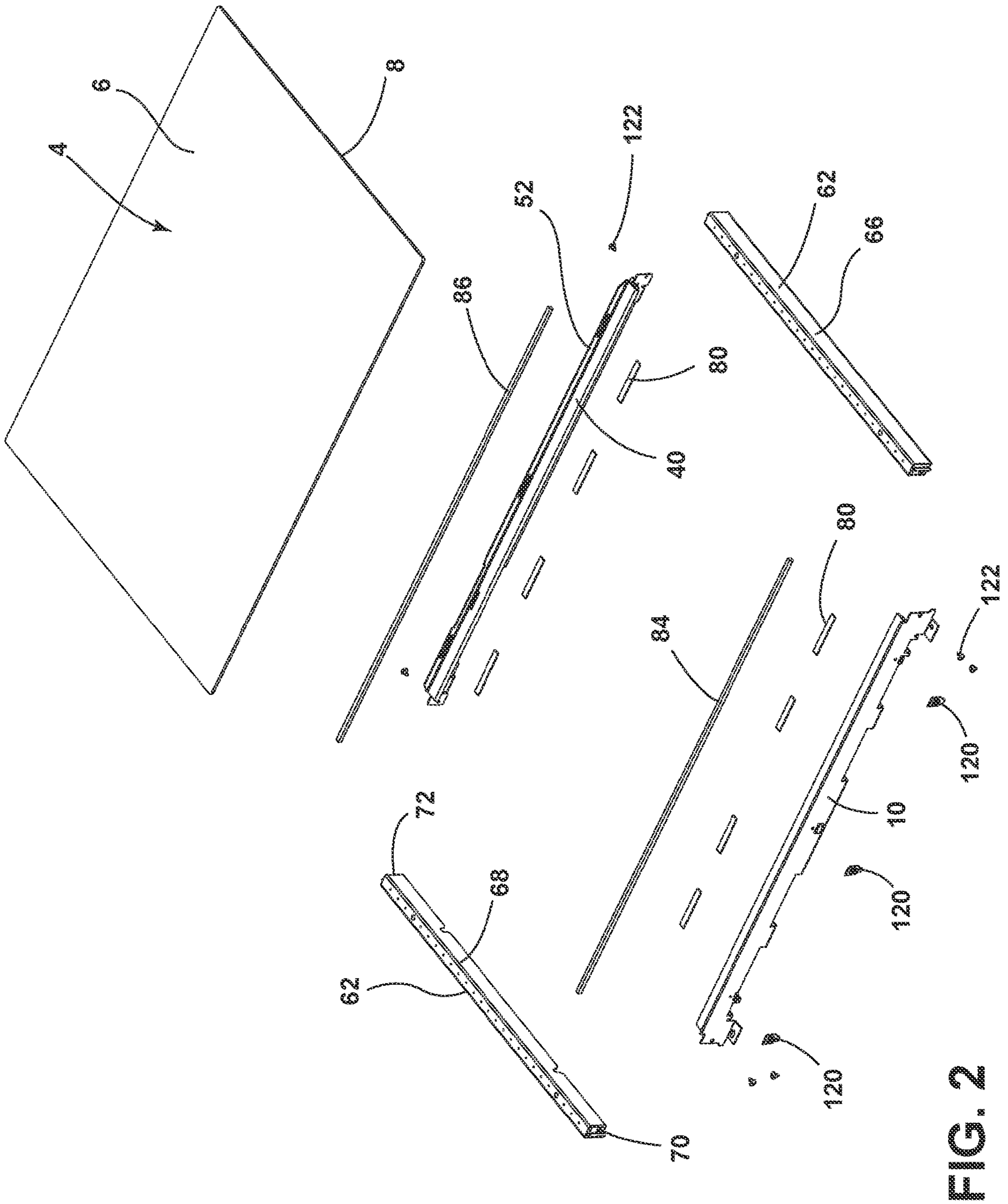
FIG. 2 is a top perspective view of the components of the cooktop assembly shown in FIG. 1.
Figure 3:
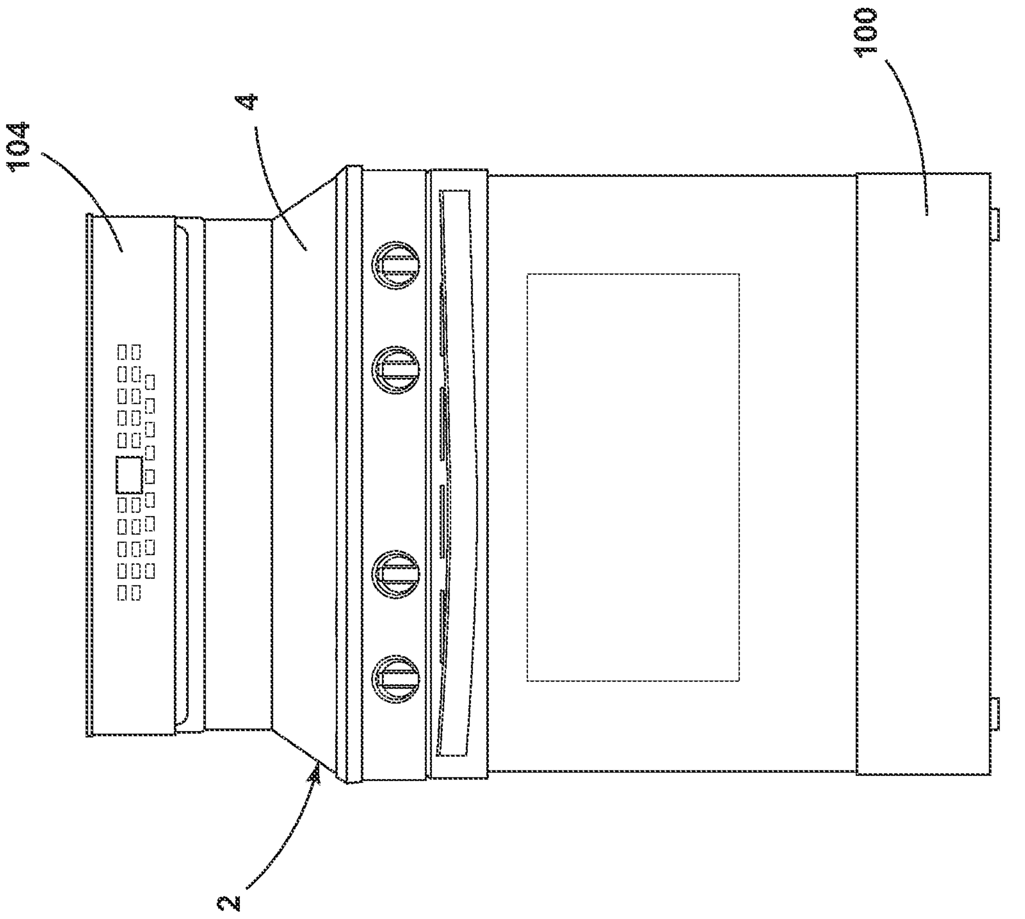
FIG. 3 is a front perspective view of the cooktop assembly shown in FIG. 1 installed on an oven having rear controls.
Figure 4:
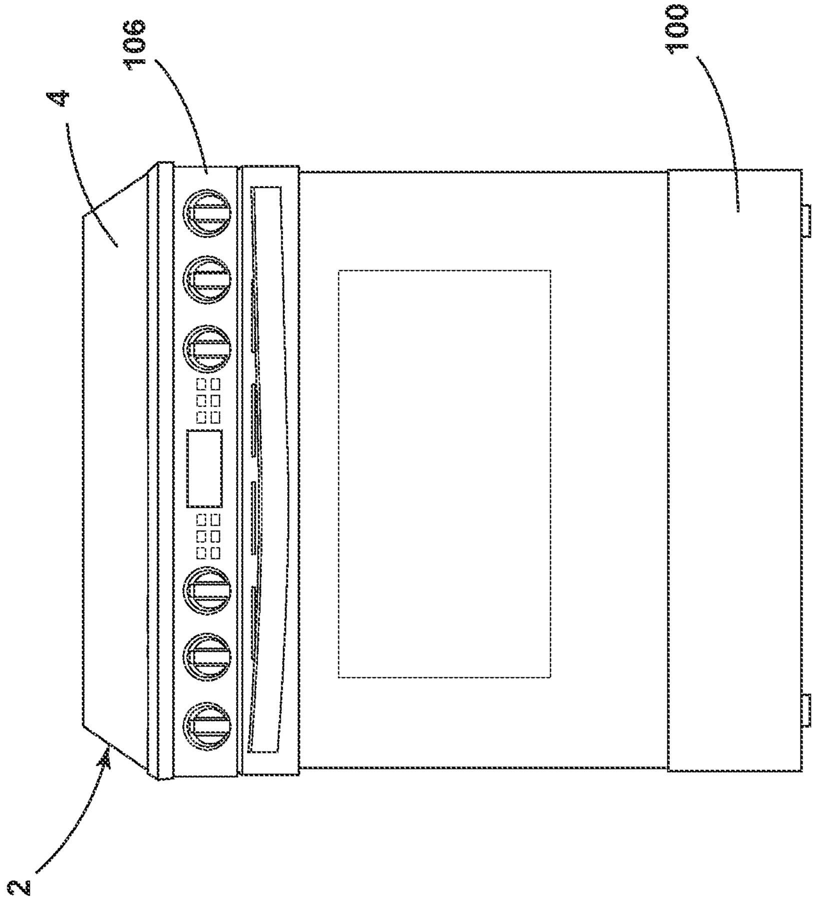
FIG. 4 is a front perspective view of the cooktop assembly of FIG. 1 installed on an oven having front controls.
Figure 5:
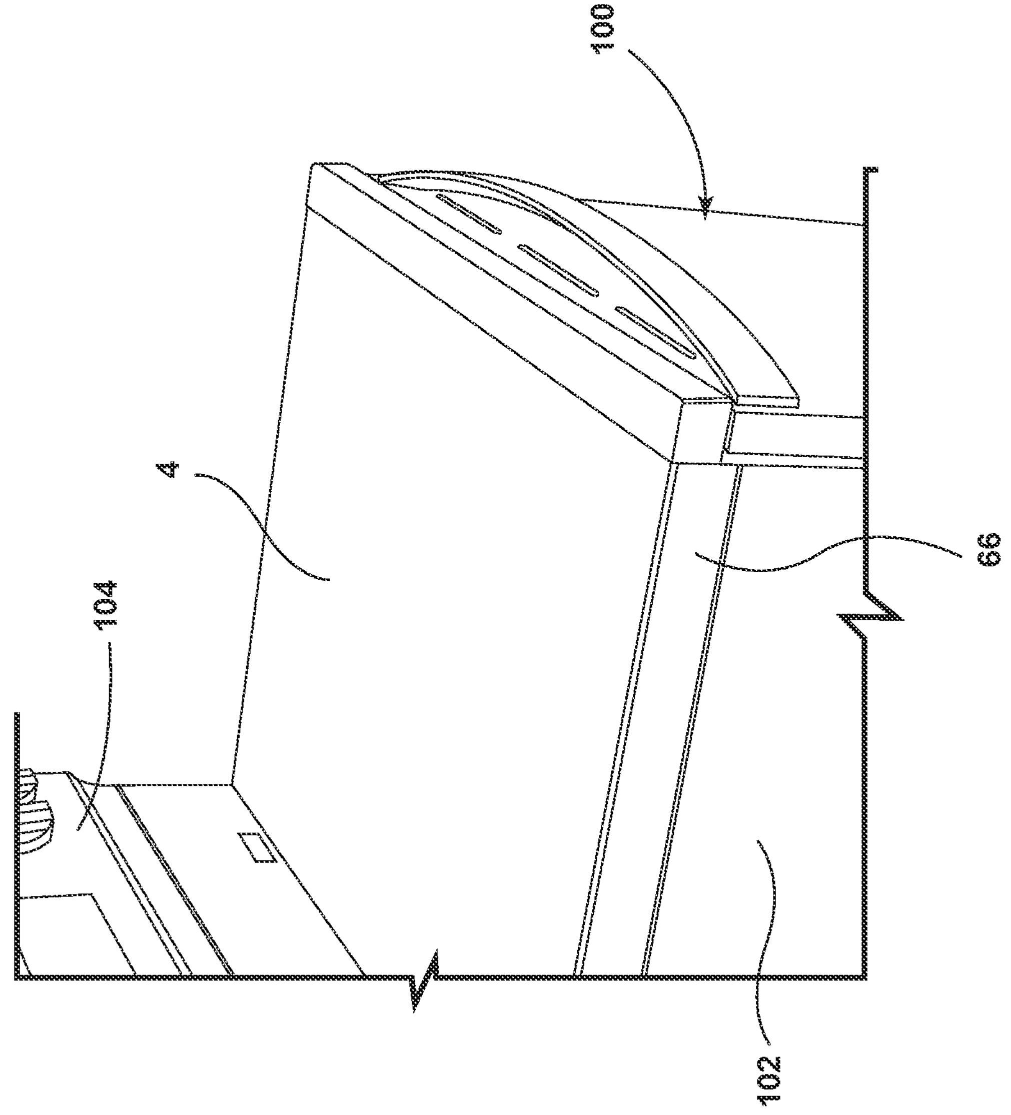
FIG. 5 is a partial side perspective view of an oven having rear controls with the cooktop assembly shown in FIG. 1.
Figure 6:
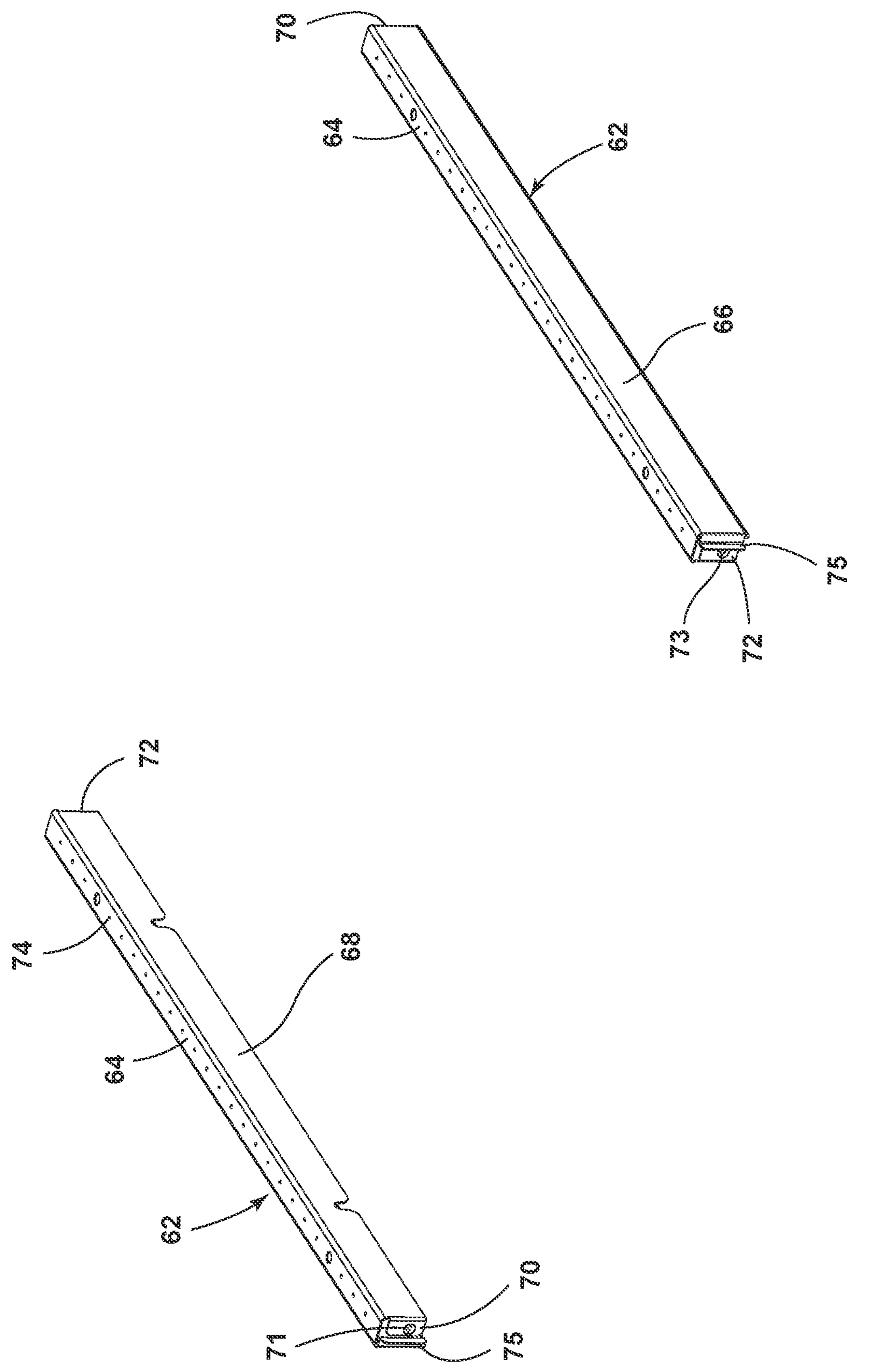
FIG. 6 is a top perspective view of the first side frame member and second side frame member of the cooktop support.
Figure 7:
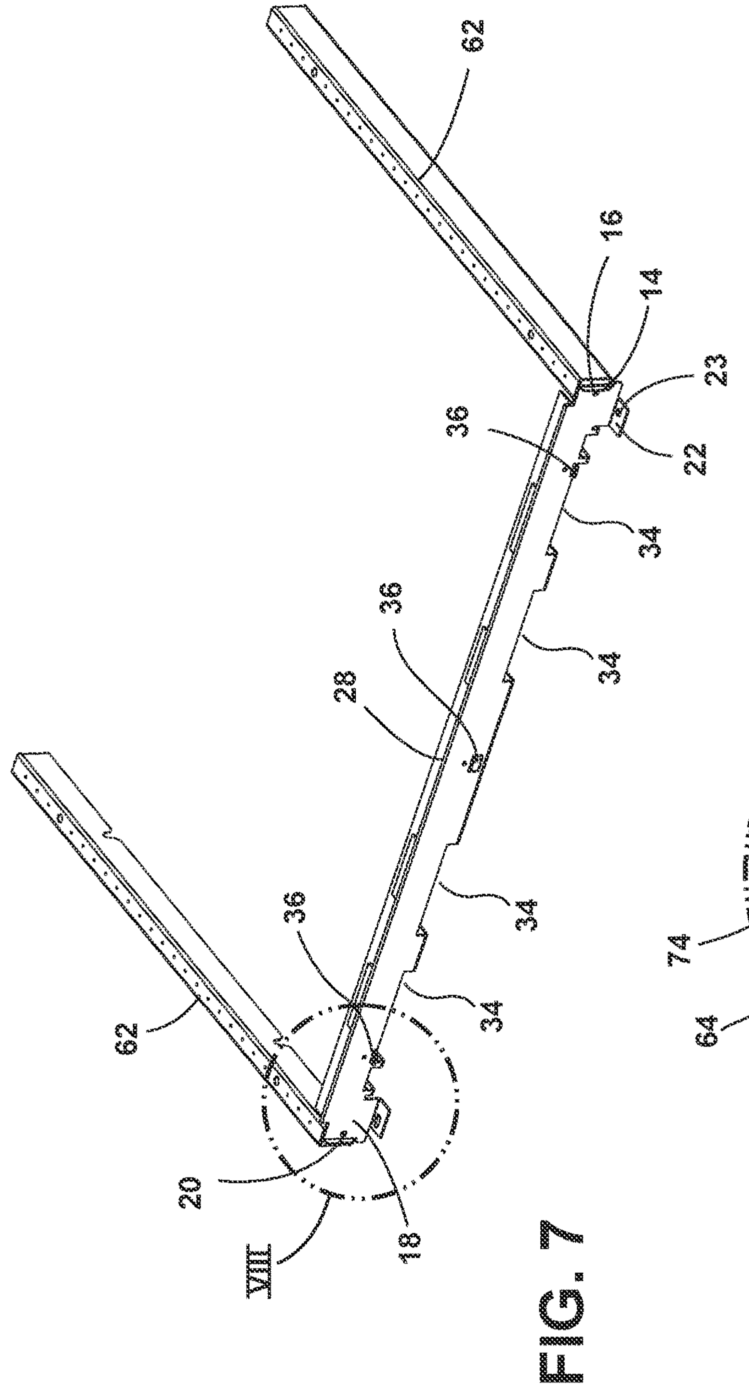
FIG. 7 is front perspective view of the first support bracket and the first and second side frame members of the cooktop support.
Figure 8:
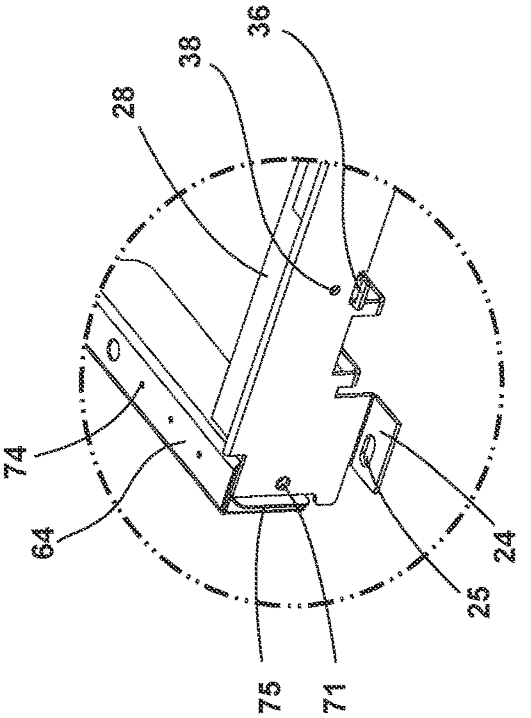
FIG. 8 is a partial front perspective view taken along section VIII of FIG. 7.
Figure 9:
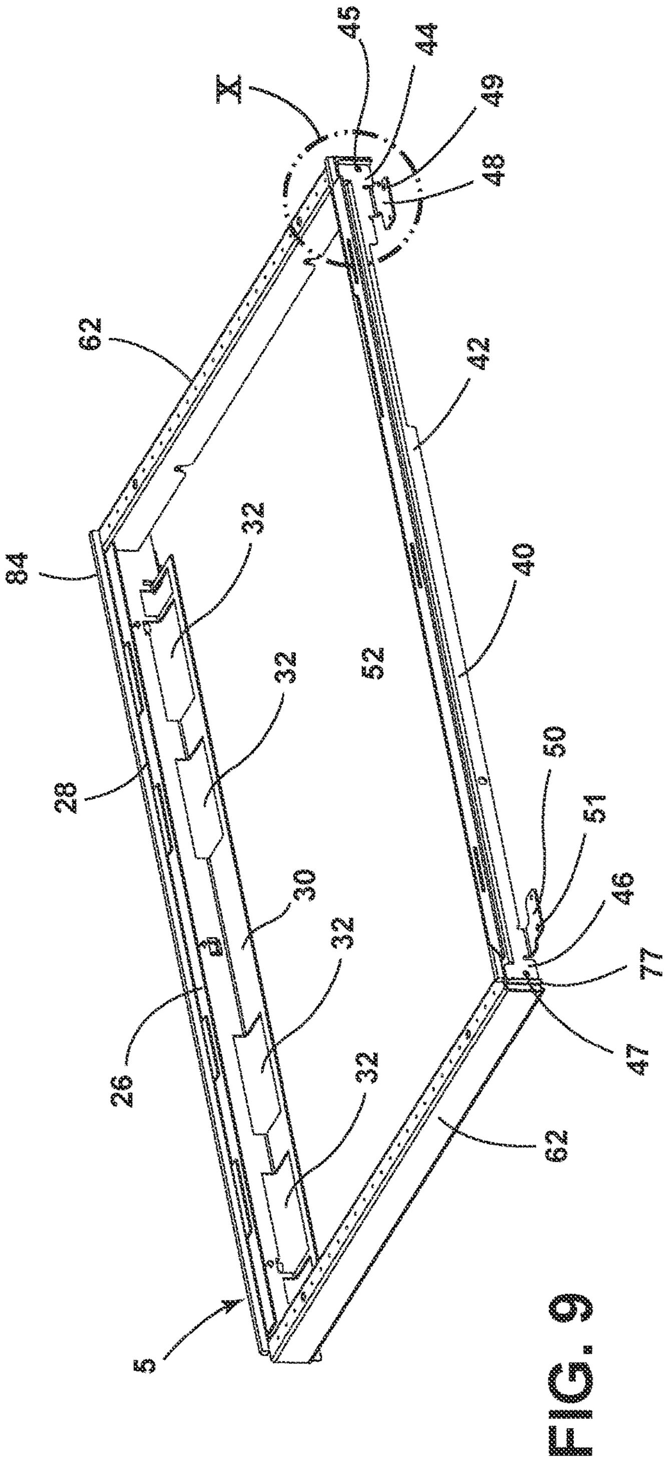
FIG. 9 is a rear perspective view of the cooktop support.

The first support bracket 10 includes a face surface 12. The face surface 12 has a first edge 14 and a second edge 18. A first fastener opening 16 is located on the first edge 14, and a second fastener opening 20 is located on the second edge 18. A first tab 22 extends perpendicularly outward from the face surface 12 adjacent to the first edge 14. The first tab 22 includes at least one first tab opening 23. Similarly, a second tab 24 extends perpendicularly outward from the face surface 12. The second tab 24 includes at least one second tab opening 25. The first support bracket 10 has an upper flange 26, as illustrated in FIG. 9, with an upper ledge surface 28. An upper wall 29 extends above the upper ledge surface 28. The first support bracket 10 also a lower flange 30. Openings 32 in the lower flange 30 align with openings 34 in the face surface 12 of the first support bracket 10. The openings 32, 34 help reduce the weight of the cooktop assembly 2 and can provide airflow pathways for the oven 100. The face surface 12 of the first support bracket 10 can include a plurality of tab receiver slots 36 with openings 38 positioned above the tab receiver slots 36. As illustrated in FIG. 2, tabs 120 can be positioned in the tab receiver slots 36. The tabs 120 can include openings that align with the openings 38 such that a fastener can be used to secure the tab 120 to the tab receiver slot 36 to the face surface 12 of the first support bracket 10. The tab 120 can be used to help couple a control housing or trim piece (not shown) to the cooktop assembly 2.

Figure 10:
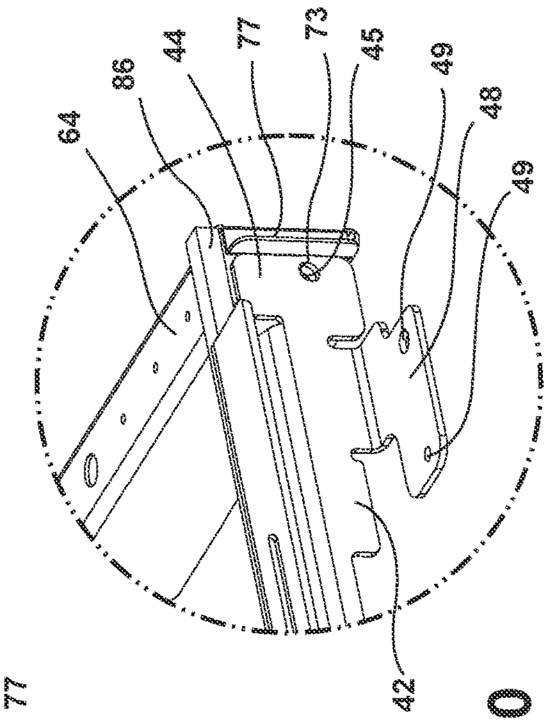
FIG. 10 is a partial rear perspective view taken along section X of FIG. 9.
Figure 11:
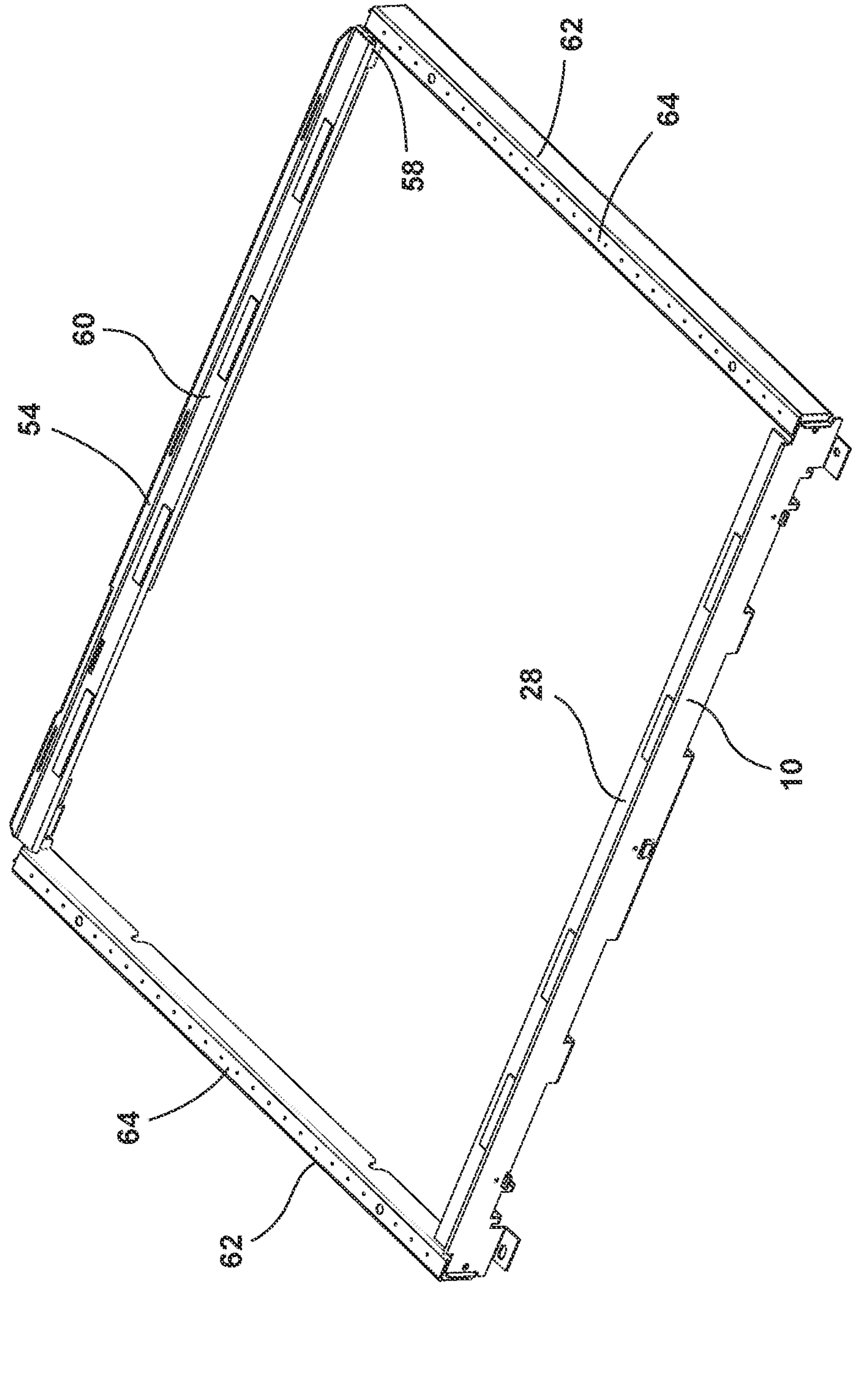
FIG. 11 is a front perspective view of the cooktop support.
Figure 12:
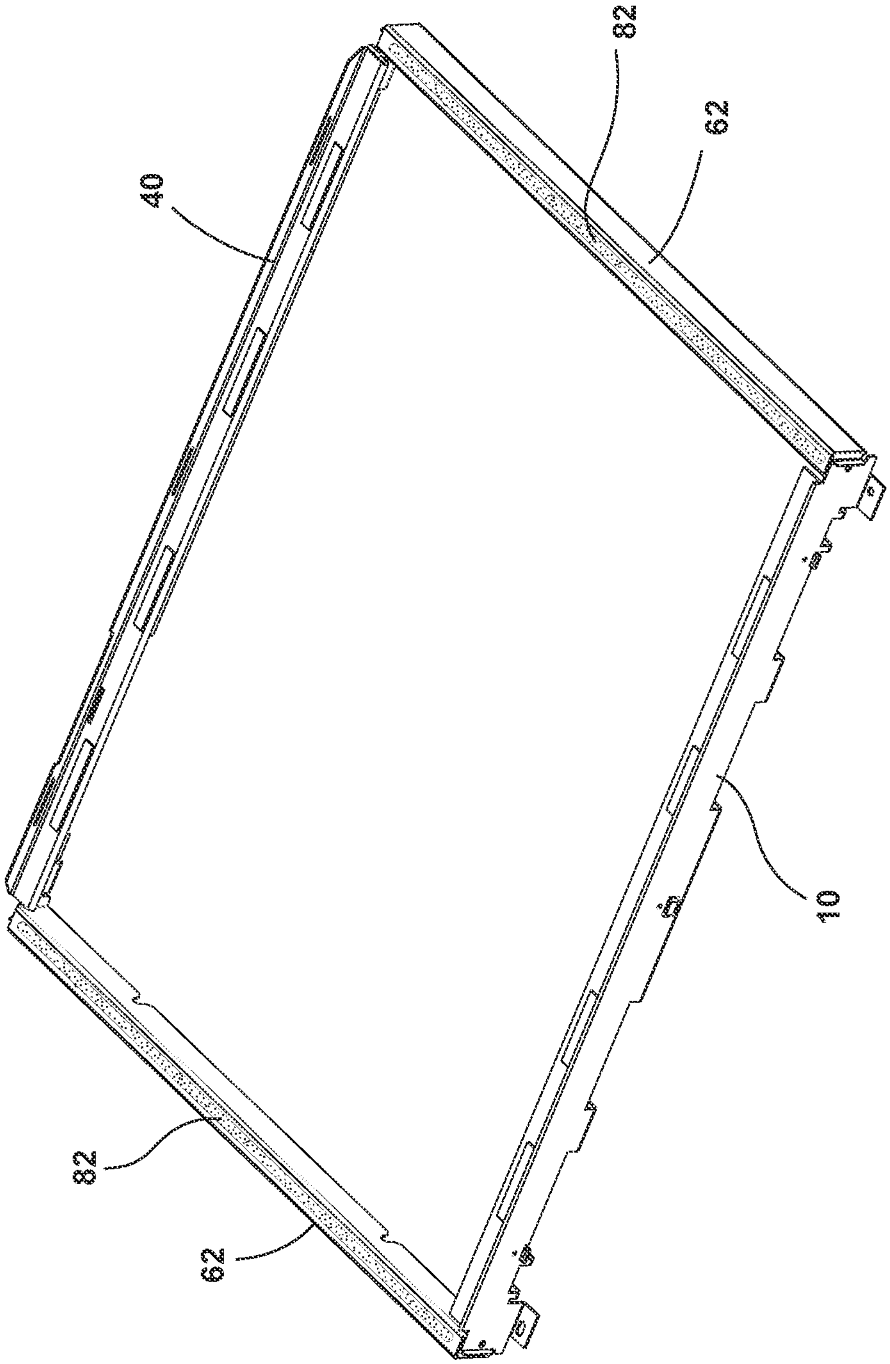
FIG. 12 is a front perspective view of the cooktop support with adhesive on the side frame members.
Figure 13:
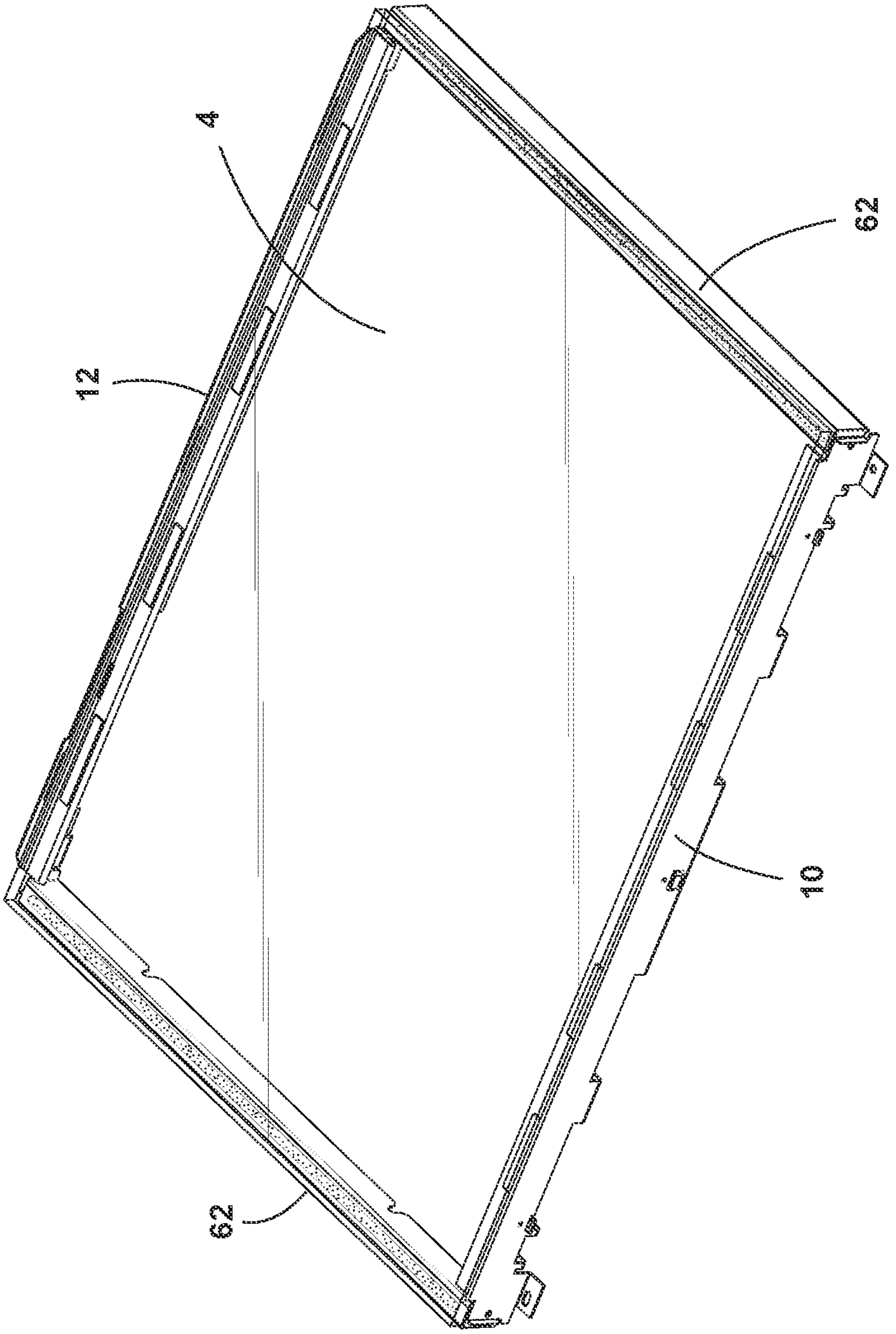
FIG. 13 is a front perspective view of the cooktop assembly with the glass cooktop installed on the cooktop support.
Figure 14:
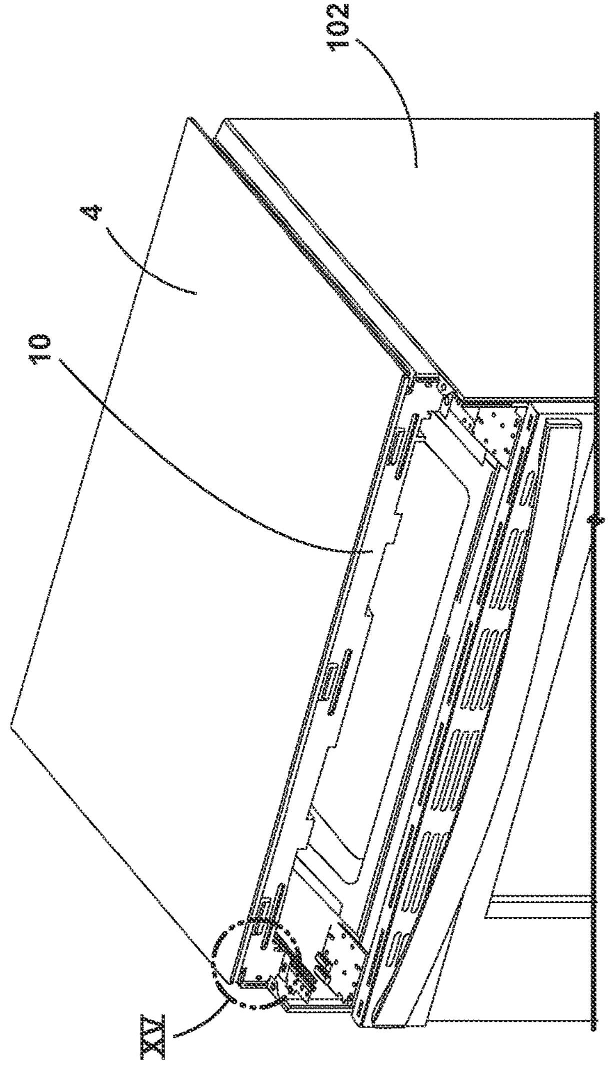
FIG. 14 is a partial front perspective view of the cooktop assembly being installed onto an oven.
Figure 15:
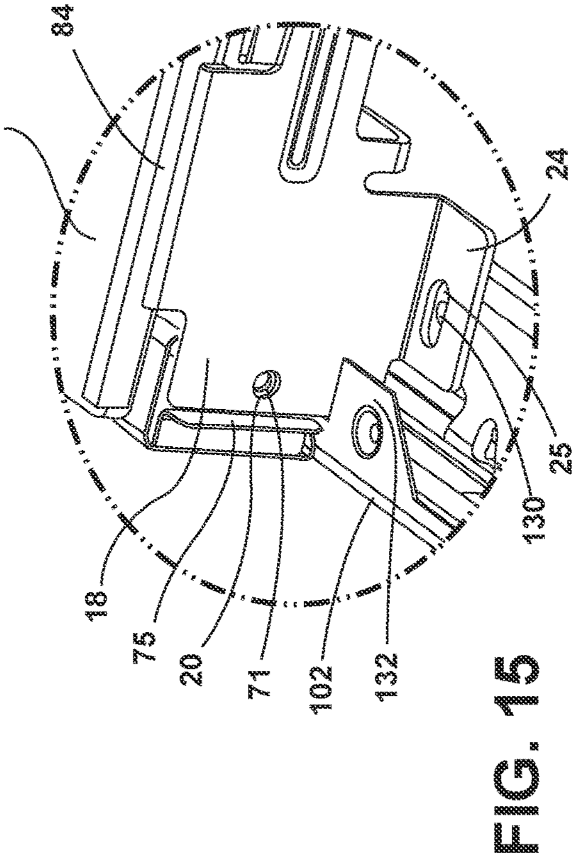
FIG. 15 is a front perspective view taken along section XV of FIG. 14.
Figure 16:
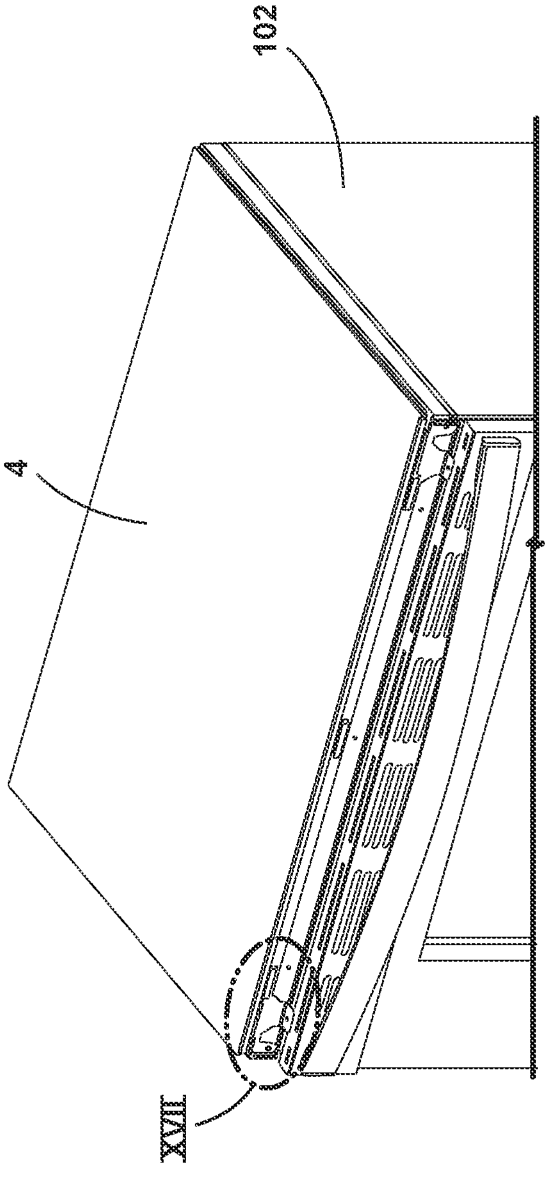
FIG. 16 is an alternative installation of a cooktop support with a different first support bracket installed on an oven chassis.
Figure 17:
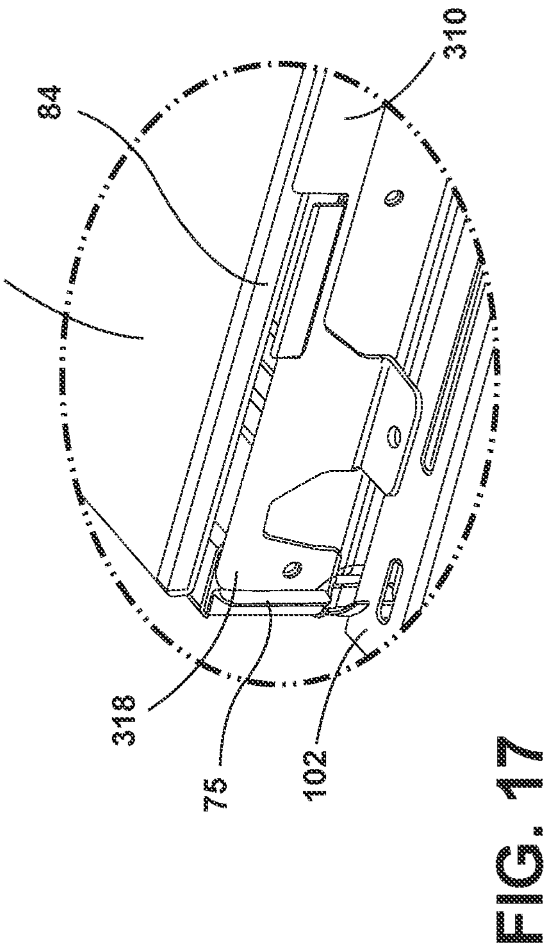
FIG. 17 is a partial front perspective view taken along section XVII of FIG. 16.

The second support bracket 40 includes a face surface 42, as illustrated in FIG. 9. The face surface 42 has a first edge 44 with a first fastener opening 45 and a second edge 46 with a second fastener opening 47. A first tab 48 extends outwardly from the face surface 42 adjacent to the first edge 44, and a second tab 50 extends outwardly from the face surface 42 adjacent to the second edge 46, as illustrated in FIG. 9. The first tab 48 and second tab 50 can have one or more fastener openings 49, 51 as illustrated in FIGS. 9 and 10. An inclined surface 54 extends inwardly from the face 42 of the second support bracket 40 to a bend 58. A ledge surface 60 extends from the bend 58 to an upwardly extending flange portion 52. The ledge surface 60 of the second support bracket 40 includes a surface that is generally perpendicular to the face surface 42. The upwardly extending flange portion 52 can be straight or angled. The upwardly extending flange portion 52 can also include a plurality of openings that can receive fasteners, portions of the rear vent housing 210, and/or components of the chassis 102 of an oven 100.

Sections of tape 80 may be placed on the ledge surface 60 of the second support bracket 40 and/or the upper ledge 28 of first support bracket 10. Adhesive 82 can be positioned on the upper surface 64 of the side frame member 62. When used, the adhesive 82 and tape 80 will contact the lower surface 8 of the glass cooktop 4 thereby helping to couple the glass cooktop 4 to the cooktop support 5.

The cooktop assembly 2 is positioned above the heating elements on the oven 100 such that the heating elements can heat portions of the glass cooktop 4. Where the cooktop assembly 2 is coupled to the oven 100 depends upon whether or not the oven 100 includes front controls 106 or rear controls 104. The first tab 22 and the second tab 24 of the first support bracket 10 can be coupled to the chassis 102 of the oven 100 by fasteners inserted through the first tab opening 23 and second tab opening 24 into openings in the chassis 102 of oven 100. Similarly, the first tab 48 and the second tab 50 of the second support bracket 40 can be coupled to the chassis 102 of the oven 100 by the insertion of fasteners through the openings 49 and 51 in the first tab 48 and second tab 50. Surfaces of the cooktop support 5 can also rest on surfaces of the chassis 102 of oven 100. The position of the cooktop assembly 2 on the chassis 102 of the oven 100 is dependent upon where the controls are located and/or where the heating elements are located for oven 100.

Figure 18:
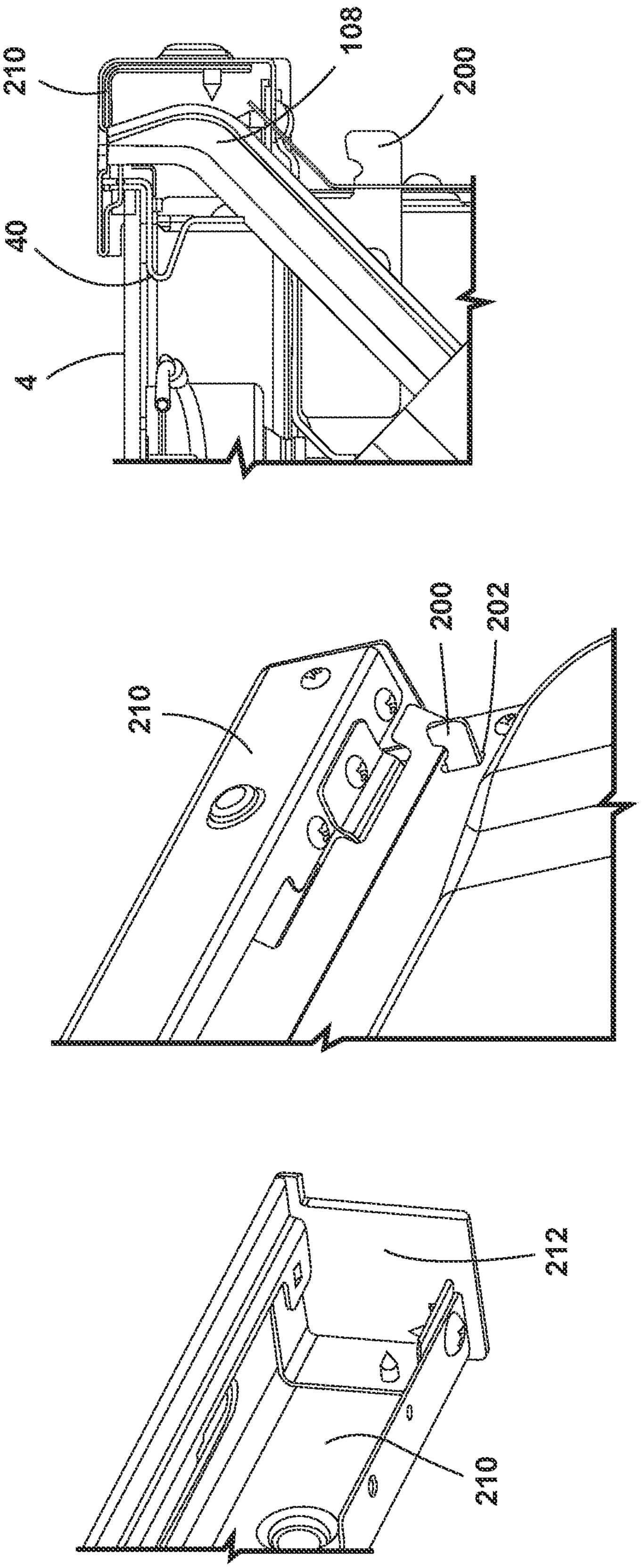
FIG. 18 illustrates a rear vent trim of an oven.
Figure 19:
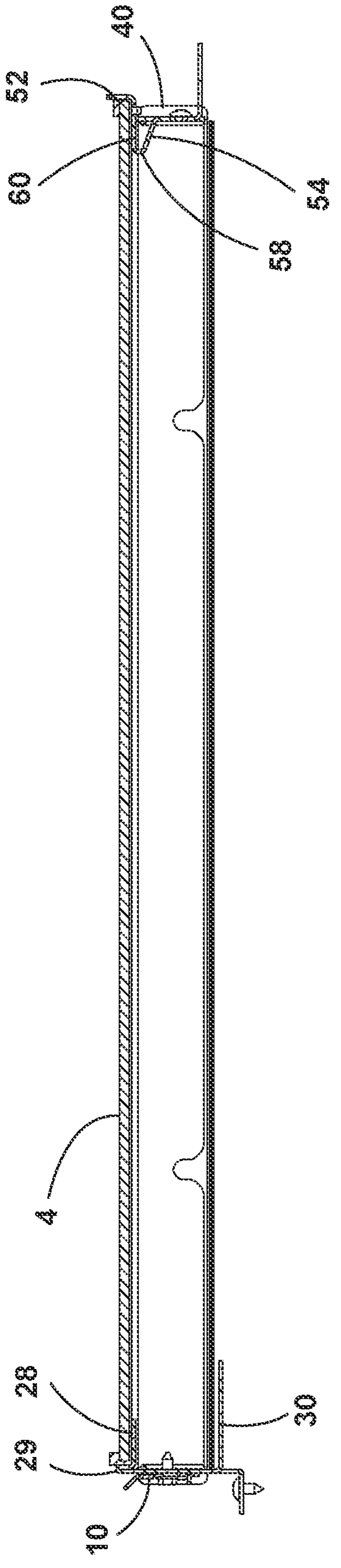
FIG. 19 is a cross section view of the cooktop assembly shown in FIG. 1 taken along section XIX.

A vent 108 can be coupled to the oven 100 adjacent to the rear surface of the cooktop assembly 2, as shown in FIG. 18. The rear vent housing 210 can include a cap 212 and one or more tabs 200 that can extend into openings 202 of the chassis 102, as illustrated in FIG. 18.

As shown in the illustrated embodiments, the glass cooktop 4 extends over the majority, if not the entirety, of the upper surface 64 of the side frame member 62, thus presenting an edge-to-edge glass cooktop, as illustrated in FIGS. 1, 3-5, 14, and 16. No portion of side frame member 62 extends above the glass cooktop 4. The glass cooktop assembly 2 can also include a first edge protector 84 and a second edge protector 86. The first edge protector 84 is positioned adjacent to the first support bracket 10 and the second edge protector 86 is positioned adjacent to the second support bracket 40. The first edge protector 84 and second edge protector 86 can be gaskets that can be shaped to positioned between the surfaces of the glass cooktop 4 that are adjacent to the upper wall 29 of the first support bracket 10 and the upwardly extending flange portion 52 of the second support bracket 40. For example, the edge protectors 84, 86 could be L-shaped rubber gaskets. The glass cooktop 4 can thus extend over the majority of the ledge section 60 and upper ledge 28 of the support brackets 10, 40. The side frame members 62 and support brackets 10, 40 can be made of any suitable high strength material. In the illustrated embodiments, they are made from metal.

According to one aspect of the present is a cooktop assembly with a cooktop support, including: a first side frame member having an upper surface, a face surface, an inner surface, a first end surface with a first fastener opening and a second end surface with a second fastener opening; a second side frame member having an upper surface, a face surface, an inner surface, a first end surface with a first fastener opening and a second end surface with a second fastener opening; a first support bracket including a face surface having a first fastener opening on a first edge, a second fastener opening on a second edge, a first tab extending perpendicularly outward from the face surface adjacent to the first edge, a second tab extending perpendicularly outward from the face surface adjacent to the second edge, an upper flange portion extending perpendicularly inward from a rear surface, positioned below the top of the first support bracket forming an upper ledge with an upper wall, a lower flange portion extending perpendicularly inward from the face surface, the lower flange portion including a plurality of openings that extend to a plurality of openings in the face surface; and a second support bracket including a face surface, having a first fastener opening on a first edge, a second fastener opening on a second edge, a first tab extending perpendicularly outward from the face surface adjacent to the first edge, a second tab extending perpendicularly outward from the face surface adjacent to the second edge, an inclined surface extending inwardly from an upper edge of the face surface to a bend, a ledge surface extending from the bend to an upwardly extending flange portion, the ledge surface including a section that is generally perpendicular to the face surface. The first fastener opening on the first support bracket is aligned with the first fastener opening on the first side frame member and the second fastener opening on the first support bracket is aligned with the second fastener opening on the second side frame member. The first fastener opening on the second support bracket is aligned with the second fastener opening on the first side frame member and the second fastener opening on the second support bracket is aligned with the first fastener opening on the second side frame member. Fasteners are coupled to the aligned openings. A glass cooktop is coupled to the cooktop support with the bottom surface of the glass cooktop positioned above the upper surfaces of the first and second side frame members and above the upper ledge of the first support bracket and the ledge surface of the second support bracket.

According to another aspect, the present cooktop assembly includes a plurality of tab receiver slots extending from the face of the first support bracket.

According to another aspect of the present cooktop assembly includes a plurality of tabs with fastener openings that are received in the plurality of tab receiver slots on the first support bracket.

According to another aspect, the present cooktop assembly includes a plurality of fasteners that are inserted through the fastener openings in the tabs and into openings positioned above the tab receiver slots on the face of the first support bracket.

According to another aspect, the present cooktop assembly includes at least one strip of tape on the upper ledge of the first support bracket and at least one strip of tape on the ledge surface of the second support bracket that contacts the bottom surface of the glass cooktop.

According to another aspect, the present cooktop assembly includes adhesive on at least a portion of the upper surfaces of the first side frame member and the second side frame member that contacts the bottom surface of the glass cooktop.

According to another aspect, the present cooktop assembly includes a first edge protector positioned between an edge of the glass cooktop and the upper wall of the first support bracket.

According to another aspect, the present cooktop assembly includes a second edge protector positioned between an edge of the glass cooktop and the upwardly extending flange portion of the support bracket.

According to another aspect, the cooktop assembly comprises a cooktop support, including: a first side frame member having an upper surface, a face surface, an inner surface, a first end surface with a first fastener opening and a second end surface with a second fastener opening; a second side frame member having an upper surface, a face surface, an inner surface, a first end surface with a first fastener opening and a second end surface with a second fastener opening; a first support bracket including a face surface having a first fastener opening on a first edge, a second fastener opening on a second edge, a first tab extending perpendicularly outward from the face surface adjacent to the first edge, a second tab extending perpendicularly outward from the face surface adjacent to the second edge, an upper flange portion extending perpendicularly inward from a rear surface, positioned below the top of the first support bracket forming an upper ledge with an upper wall, a lower flange portion extending perpendicularly inward from the face surface; and a second support bracket including a face surface, having a first fastener opening on a first edge, a second fastener opening on a second edge, a first tab extending perpendicularly outward from the face surface adjacent to the first edge, a second tab extending perpendicularly outward from the face surface adjacent to the second edge, an inclined surface extending inwardly from an upper edge of the face surface to a bend, a ledge surface extending from the bend to an upwardly extending flange portion, the ledge surface including a section that is generally perpendicular to the face surface. The first fastener opening on the first support bracket is aligned with the first fastener opening on the first side frame member and the second fastener opening on the first support bracket is aligned with the second fastener opening on the second side frame member. The first fastener opening on the second support bracket is aligned with the second fastener opening on the first side frame member and the second fastener opening on the second support bracket is aligned with the first fastener opening on the second side frame member. Fasteners are coupled to the aligned openings. Tape is positioned on at least a portion of the upper ledge of the first support bracket and the ledge surface of the second support bracket. Adhesive is positioned on at least a portion of the upper surface of the first and second side frames. A glass cooktop coupled to the cooktop support with the bottom surface of the glass cooktop contacting the tape and the adhesive.

According to another aspect, the present cooktop assembly includes a heating element assembly with a lower plate that has fastener openings that align with fastener openings on the chassis side panels of a stove.

According to another aspect, the present cooktop assembly includes a plurality of tabs coupled to the first support bracket.

According to another aspect, the present cooktop assembly includes a plurality of fasteners are inserted through fastener openings in the tabs and in openings on the face of the first support bracket.

According to another aspect, the present cooktop assembly includes a first edge protector positioned between an edge of the glass cooktop and the upper wall of the first support bracket.

According to another aspect, the present cooktop assembly includes a second edge protector positioned between an edge of the glass cooktop and the upwardly extending flange portion of the support bracket.

According to another aspect, the present cooktop assembly includes the side edges of the glass cooktop extend over the majority of the upper surfaces of the first and second side frame members.

According to another aspect, the oven with a cooktop assembly, comprises an oven with a chassis and a cooktop support, including: a first side frame member having an upper surface, a face surface, an inner surface, a first end surface with a first fastener opening and a second end surface with a second fastener opening; a second side frame member having an upper surface, a face surface, an inner surface, a first end surface with a first fastener opening and a second end surface with a second fastener opening; a first support bracket including a face surface having a first fastener opening on a first edge, a second fastener opening on a second edge, a first tab extending perpendicularly outward from the face surface adjacent to the first edge with a first tab opening, a second tab extending perpendicularly outward from the face surface adjacent to the second edge with a second tab opening, an upper flange portion extending perpendicularly inward from a rear surface, positioned below the top of the first support bracket forming an upper ledge with an upper wall; and a second support bracket including a face surface, having a fastener opening on a first edge, a second fastener opening on a second edge, a first tab extending perpendicularly outward from the face surface adjacent to the first edge, a second tab extending perpendicularly outward from the face surface adjacent to the second edge, an inclined surface extending inwardly from an upper edge of the face surface to a bend, a ledge surface extending from the bend, the ledge surface including a section that is generally perpendicular to the face surface. The first fastener opening on the first support bracket is aligned with the first fastener opening on the first side frame member and the second fastener opening on the first support bracket is aligned with the second fastener opening on the second side frame member. The first fastener opening on the second support bracket is aligned with the second fastener opening on the first side frame member and the second fastener opening on the second support bracket is aligned with the first fastener opening on the second side frame member. Fasteners are coupled to the aligned openings. Adhesive is positioned on at least a portion of the upper surfaces of the first and second side frames. A glass cooktop is coupled to the cooktop support with the bottom surface of the glass cooktop contacting the adhesive. The cooktop support is coupled to the chassis of the oven by fasteners inserted through the first tab opening and the second tab opening on the first support bracket into openings in the chassis.

According to another aspect, the present cooktop assembly includes a heating element assembly with a lower plate that has fastener openings that align with fastener openings on the chassis side panels of a stove.

According to another aspect, the present cooktop assembly includes at least one strip of tape on the first support bracket and the second support bracket.

According to another aspect, the present cooktop assembly includes a first edge protector positioned between an edge of the glass cooktop and the upper wall of the first support bracket.

According to another aspect, the present cooktop assembly includes a second edge protector positioned between an edge of the glass cooktop and the upwardly extending flange portion of the support bracket.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A cooktop assembly, comprising:

a cooktop support, including:

a first side frame member having an upper surface, a face surface, an inner surface, a first end surface with a first fastener opening and a second end surface with a second fastener opening;

a second side frame member having an upper surface, a face surface, an inner surface, a first end surface with a first fastener opening and a second end surface with a second fastener opening;

a first support bracket including a face surface having a first fastener opening on a first edge, a second fastener opening on a second edge, a first tab extending perpendicularly outward from said face surface adjacent to said first edge, a second tab extending perpendicularly outward from said face surface adjacent to said second edge, an upper flange portion extending perpendicularly inward from a rear surface, positioned below the top of said first support bracket forming an upper ledge with an upper wall, a lower flange portion extending perpendicularly inward from said face surface, said lower flange portion including a plurality of openings that extend to a plurality of openings in said face surface;

a second support bracket including a face surface, having a first fastener opening on a first edge, a second fastener opening on a second edge, a first tab extending perpendicularly outward from said face surface adjacent to said first edge, a second tab extending perpendicularly outward from said face surface adjacent to said second edge, an inclined surface extending inwardly from an upper edge of said face surface to a bend, a ledge surface extending from said bend to an upwardly extending flange portion, said ledge surface including a section that is generally perpendicular to said face surface;

wherein the first fastener opening on said first support bracket is aligned with the first fastener opening on said first side frame member and the second fastener opening on said first support bracket is aligned with the second fastener opening on said second side frame member;

wherein the first fastener opening on said second support bracket is aligned with the second fastener opening on said first side frame member and the second fastener opening on said second support bracket is aligned with the first fastener opening on said second side frame member; and fasteners are coupled to said aligned openings; and a glass cooktop coupled to said cooktop support with the bottom surface of the glass cooktop positioned above the upper surfaces of said first and second side frame members and above the upper ledge of the first support bracket and the ledge surface of the second support bracket.

2. The cooktop assembly of claim 1, including a plurality of tab receiver slots extending from said face of said first support bracket.

3. The cooktop assembly of claim 2, including a plurality of tabs with fastener openings that are received in said plurality of tab receiver slots on said first support bracket.

4. The cooktop assembly of claim 3, wherein a plurality of fasteners are inserted through the fastener openings in said tabs and into openings positioned above the tab receiver slots on said face of said first support bracket.

5. The cooktop assembly of claim 1, including at least one strip of tape on the upper ledge of said first support bracket and at least one strip of tape on the ledge surface of said second support bracket that contacts the bottom surface of said glass cooktop.

6. The cooktop assembly of claim 5, including adhesive on the upper surfaces of the first side frame member and the second side frame member that contacts said bottom surface of said glass cooktop.

7. The cooktop assembly of claim 1, including a first edge protector positioned between an edge of said glass cooktop and said upper wall of said first support bracket.

8. The cooktop assembly of claim 7, including a second edge protector positioned between an edge of said glass cooktop and said upwardly extending flange portion of said support bracket.

9. A cooktop assembly, comprising:

a cooktop support, including:

a first side frame member having an upper surface, a face surface, an inner surface, a first end surface with a first fastener opening and a second end surface with a second fastener opening;

a second side frame member having an upper surface, a face surface, an inner surface, a first end surface with a first fastener opening and a second end surface with a second fastener opening;

a first support bracket including a face surface having a first fastener opening on a first edge, a second fastener opening on a second edge, a first tab extending perpendicularly outward from said face surface adjacent to said first edge, a second tab extending perpendicularly outward from said face surface adjacent to said second edge, an upper flange portion extending perpendicularly inward from a rear surface, positioned below the top of said first support bracket forming an upper ledge with an upper wall, a lower flange portion extending perpendicularly inward from said face surface;

a second support bracket including a face surface, having a first fastener opening on a first edge, a second fastener opening on a second edge, a first tab extending perpendicularly outward from said face surface adjacent to said first edge, a second tab extending perpendicularly outward from said face surface adjacent to said second edge, an inclined surface extending inwardly from an upper edge of said face surface to a bend, a ledge surface extending from said bend to an upwardly extending flange portion, said ledge surface including a section that is generally perpendicular to said face surface;

wherein the first fastener opening on said first support bracket is aligned with the first fastener opening on said first side frame member and the second fastener opening on said first support bracket is aligned with the second fastener opening on said second side frame member;

wherein the first fastener opening on said second support bracket is aligned with the second fastener opening on said first side frame member and the second fastener opening on said second support bracket is aligned with the first fastener opening on said second side frame member; and fasteners are coupled to said aligned openings;

tape positioned on at least a portion of the upper ledge of said first support bracket and the ledge surface of said second support bracket;

adhesive positioned on at least a portion of said upper surface of said first and second side frames; and a glass cooktop coupled to said cooktop support with the bottom surface of the glass cooktop contacting said tape and said adhesive.

10. The cooktop assembly of claim 9, including a heating element assembly with a lower plate that has fastener openings that align with fastener openings on the chassis side panels of a stove.

11. The cooktop assembly of claim 9, including a plurality of tabs coupled to said first support bracket.

12. The cooktop assembly of claim 11, wherein a plurality of fasteners are inserted through fastener openings in said tabs and in openings on said face of said first support bracket.

13. The cooktop assembly of claim 9, including a first edge protector positioned between an edge of said glass cooktop and said upper wall of said first support bracket.

14. The cooktop assembly of claim 13, including a second edge protector positioned between an edge of said glass cooktop and said upwardly extending flange portion of said support bracket.

15. The cooktop assembly of claim 9, wherein the side edges of said glass cooktop extend over the majority of the upper surfaces of said first and second side frame members.

16. An oven with a cooktop assembly, comprising:

an oven with a chassis;

a cooktop support, including:

a first side frame member having an upper surface, a face surface, an inner surface, a first end surface with a first fastener opening and a second end surface with a second fastener opening;

a second side frame member having an upper surface, a face surface, an inner surface, a first end surface with a first fastener opening and a second end surface with a second fastener opening;

a first support bracket including a face surface having a first fastener opening on a first edge, a second fastener opening on a second edge, a first tab extending perpendicularly outward from said face surface adjacent to said first edge with a first tab opening, a second tab extending perpendicularly outward from said face surface adjacent to said second edge with a second tab opening, an upper flange portion extending perpendicularly inward from a rear surface, positioned below the top of said first support bracket forming an upper ledge with an upper wall;

a second support bracket including a face surface, having a fastener opening on a first edge, a second fastener opening on a second edge, a first tab extending perpendicularly outward from said face surface adjacent to said first edge, a second tab extending perpendicularly outward from said face surface adjacent to said second edge, an inclined surface extending inwardly from an upper edge of said face surface to a bend, a ledge surface extending from said bend, said ledge surface including a section that is generally perpendicular to said face surface;

wherein the first fastener opening on said first support bracket is aligned with the first fastener opening on said first side frame member and the second fastener opening on said first support bracket is aligned with the second fastener opening on said second side frame member;

wherein the first fastener opening on said second support bracket is aligned with the second fastener opening on said first side frame member and the second fastener opening on said second support bracket is aligned with the first fastener opening on said second side frame member; and fasteners are coupled to said aligned openings;

adhesive positioned on at least a portion of said upper surfaces of said first and second side frames;

a glass cooktop coupled to said cooktop support with the bottom surface of the glass cooktop contacting said adhesive; and said cooktop support coupled to said chassis of said oven by fasteners inserted through said first tab opening and said second tab opening on said first support bracket into openings in said chassis.

17. The cooktop assembly of claim 16, including a heating element assembly with a lower plate that has fastener openings that align with fastener openings on the chassis side panels of a stove.

18. The cooktop assembly of claim 16, including at least one strip of tape on the first support bracket and the second support bracket.

19. The cooktop assembly of claim 16, including a first edge protector positioned between an edge of said glass cooktop and said upper wall of said first support bracket.

20. The cooktop assembly of claim 19, including a second edge protector positioned between an edge of said glass cooktop and said upwardly extending flange portion of said support bracket.

* * * * *